June 23, 1953
D. R. DE BOISBLANC ET AL
2,643,348
APPARATUS FOR PRODUCING A POWER
FUNCTION OF AN INPUT VOLTAGE
Filed Sept. 29, 1950
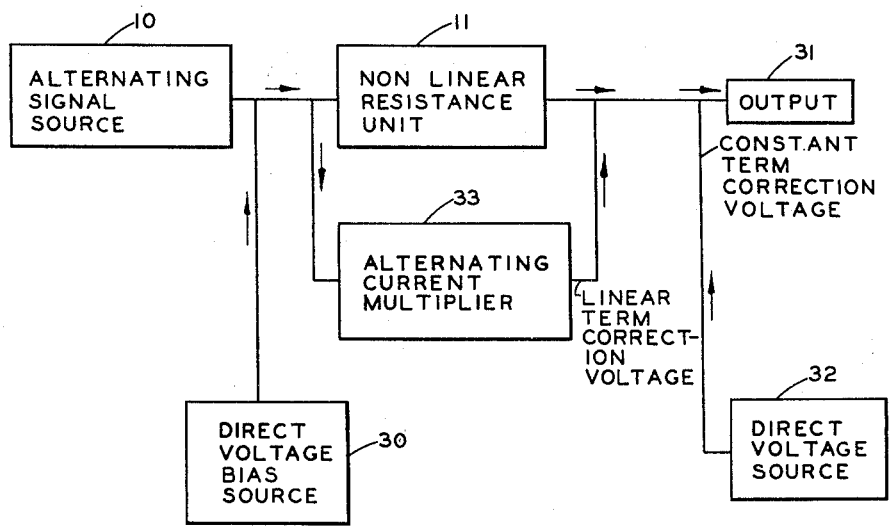
FIG. 1.
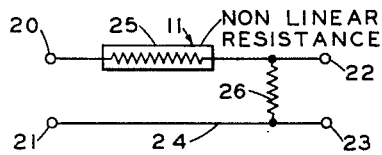
FIG. 2.
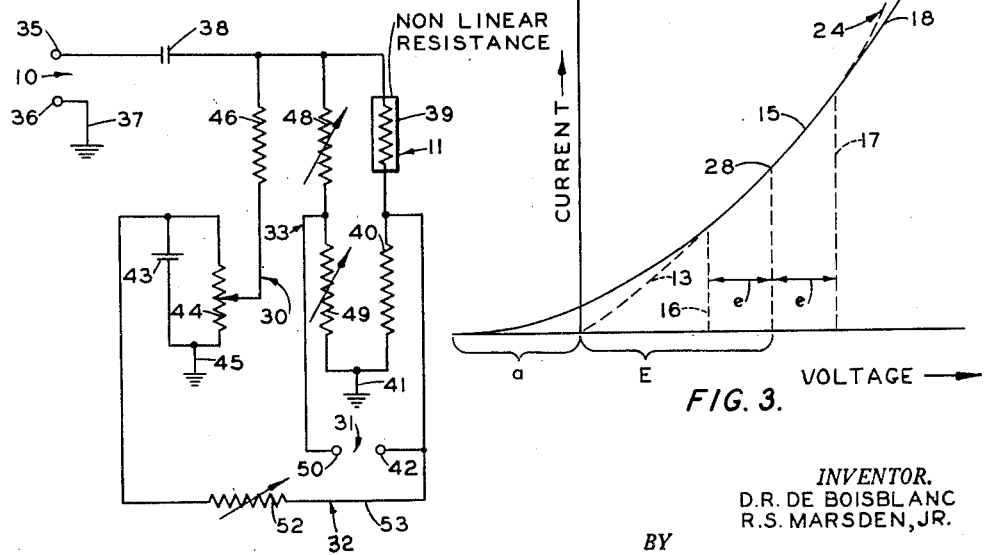
FIG. 3.
FIG. 4.
INVENTOR.
D.R. DE BOISBLANC
R.S. MARSDEN, JR.
BY
Hudson & Young
ATTORNEYS Patented June 23, 1953

2,643,348

UNITED STATES PATENT OFFICE 2,643,348

APPARATUS FOR PRODUCING A POWER FUNCTION OF AN INPUT VOLTAGE

Deslonde R. de Boisblanc and Ross S. Marsden, Jr., Bartlesville, Okla., assignors to Phillips Petroleum Company, a corporation of Delaware Application September 29, 1950, Serial No. 187,614

8 Claims. (Cl. 307—22)

This invention relates to apparatus for producing a power function of an input voltage. In one specific aspect, it relates to a circuit for producing an output voltage which is the square of the input voltage.

Circuits for producing an output which is a preselected power function, such as the square, of an input function, are extremely useful in many diversified applications. Among those may be mentioned the use of such circuit in a computing device, and the use of such circuit in the resistance or thermal noise thermometer described and claimed in the copending application of D. R. de Boisblanc and R. S. Marsden, Jr., Serial No. 220,115, filed April 9, 1951.

It is an object of this invention to provide an improved circuit in which the output voltage is equal to the instantaneous value of a power function of the input voltage.

It is a further object to provide a circuit in which the output voltage is the square of the instantaneous value of the input voltage.

It is a still further object to provide such a circuit which is of low cost, reliable in operation, and which utilizes a minimum number of standard circuit components.

Various other objects, advantages and features of the invention will become apparent from the following detailed description taken in conjunction with the accompanying drawings, in which:

Figure 1 is a block diagram of the circuit of our invention;

Figure 2 is a schematic circuit diagram of a suitable non-linear resistance unit for the circuit of Figure 1;

Figure 3 is a graph illustrating a feature of the invention; and

Figure 4 is a schematic circuit diagram of a preferred embodiment of the invention.

Referring now to Figure 1, an alternating signal voltage is supplied from a source 10 to a non-linear resistance unit 11. This unit has a characteristic or relationship between the voltage applied thereto and the current flowing therethrough which is non-linear. Thus, the relationship between the voltage and current is not expressed by Ohms law, $$I = \frac{E}{R}$$

but, rather, by the relationship $I = K(E+a)^n$ where I, E, R, K and $a$ represent, respectively, current, voltage, resistance, and constants. In general, the exponent $n$ is not constant over the entire range of applied voltage but varies, in a progressive manner, as the applied voltage is increased. This is true, in particular, of a "Thyrite" which is a particular preferred non-linear resistance element of this invention. The voltage-current characteristic of this unit is illustrated by the dotted line 24, Figure 3. At the portion 13 of the curve adjacent the origin, the exponent $n$ varies between one and two while, at the portion 14 of the curve, the exponent is greater than two and becomes progressively larger as the voltage is increased. At an intermediate portion 15 of the curve there is a substantially square law or parabolic relationship between the applied voltage and the current passing through the resistance. Thus, between the ordinates represented by lines 16 and 17, the Thyrite characteristic substantially coincides with the curve of a parabola 18 which is displaced laterally a distance of $a$ units in a leftward direction, Figure 3, from the origin of coordinates. The degree of identity between the portion 15 of the Thyrite curve and the parabola can be made as great as desired by closer spacing of the ordinates 16, 17 although this somewhat reduces the range of input signals which can be handled by the circuit, as will hereinafter become apparent.

In a typical embodiment, the unit 11 can include input terminals 20, 21, Figure 2, and output terminals 22, 23, the terminals 21, 23 being interconnected by a lead 24. Terminal 20 is connected to terminal 22 through a nonlinear resistance 25 and the output terminals 22, 23 have a fixed resistance 26 connected thereacross which is of substantially smaller ohmic value than resistance 25. As a result, current passing through the resistances produces a voltage drop across resistance 26 which can be measured at output terminals 22 and 23, this voltage drop being representative, therefore, of the current passing through resistance 25. Since resistance 26 is small as compared to resistance 25, the flow of current is essentially controlled by resistance 25 and is practically unaffected by the current passing through resistance 26. In this circuit, a voltage of E volts, for example, applied to input terminals 20, 21 produce a current I indicated by ordinate 28 upon the characteristic curve 12 and this current, in turn, produces a proportional voltage drop across resistance 26.

In accordance with the invention, when a squared output is desired, a direct voltage E is fed to the non-linear resistance unit 11 by a voltage source 30. This bias voltage is such as to cause the resistance unit 11 to operate at the center 28 of the parabolic portion 15 of its characteristic, the alternating voltage of magnitude $e$ superimposed upon the bias voltage by alternating signal source 10 causing the impressed voltage upon the unit 11 to fluctuate between the values $(E+e)$ and $(E-e)$, that is, between the ordinates 17 and 16 defining the parabolic portion of the characteristic. If it is desired to produce an output representing a power function other than the square, the bias voltage E is varied either downwardly to decrease the exponent of the power function below two or upwardly to increase the exponent of the power function above two, if being understood that the ordinates 16, 17 are so chosen that the portion of the characteristic defined thereby substantially represents the desired power function.

As a result, the current flowing through unit 11 is represented by a portion of the parabola 18 which coincides with the portion 15 of the Thyrite characteristic. That is, $$I = K(E+e+a)^2$$

The voltage appearing across resistance 26 is proportional to this current and this voltage is, after expansion of the preceding equation and substitution of new constants, as follows:

$$E_{26} = K_1 e^2 + K_2 e + K_3$$

It will be noted that the first term is proportional to $e^2$, the desired output voltage. In order to produce this voltage at output unit 31, it is necessary to cancel the second and third terms from the equation. This is done, in accordance with the invention by providing a voltage equal numerically to the constant $K_3$ from a voltage source 32, this voltage acting in opposition to the output appearing across resistance 26. In order to eliminate the second term of the last-noted equation, the voltage $e$ from source 10 is fed through an alternating current multiplier 33 which multiplies it by the constant $K_2$, the resulting voltage being applied in opposition to the output appearing across resistance 26 and cancelling the voltage representing the second term from this output. As a result, the voltage at output unit 31 is directly proportional to the square of the instantaneous value of the input voltage. If it is desired that the output represent a power function other than a square, the same procedure is carried out, the necessary correction voltages being obtained by utilizing different types of circuits, as those skilled in the art will understand.

In Figure 4, we have illustrated a preferred circuit for carrying out the invention of the block diagram, Figure 1. This circuit includes input terminals 35 and 36, the latter terminal being grounded at 37, and the former terminal being connected through a coupling condenser 38 to the non-linear resistance unit 11 comprising a non-linear resistance 39 connected in series with a fixed resistance 40 of substantially smaller ohmic value than resistance 39, the lower terminal of resistance 40 being grounded at 41. It will be evident that signal voltage passing through the resistance 39 produces a current flow therethrough in accordance with characteristic 24 of Figure 3, this current producing a proportional voltage across resistance 40 which appears at an output terminal 42 in the manner described in connection with Figure 2.

The direct voltage bias source 30 for supplying the voltage E to the non-linear resistance includes a battery 43 shunted by a potentiometer 44, one terminal of the unit thus formed being grounded at 45. The contactor of potentiometer 44 extends through a fixed resistance 46 to the non-linear resistance 39 so that a preselected bias voltage can be provided by adjustment of the potentiometer such that the resistance 39 is operated at the desired portion 15 of its characteristic. This is defined by the ordinates 16, 17 in the case of a squaring circuit.

The unit 39, 40 is shunted by a pair of series-connected resistances 48 and 49, at least one of which is variable, the junction between these latter resistances being connected to an output terminal 50. Thus, the voltage at output terminal 50, taken with respect to ground, is a predetermined fraction of the alternating signal voltage applied between the upper terminal of resistance 48 and ground. One or both variable resistances 48 or 49 is adjusted so that this fraction is the voltage $K_2 e$ which appears at output terminal 50, this voltage cancelling the corresponding voltage appearing at output terminal 42, also taken with respect to ground. That is to say, the voltage $K_2 e$ cancels the second term shown in the equation for the voltage appearing across resistance 26, Figure 2, which corresponds to resistance 40, Figure 4. The described connection of output terminal 50 also impresses a direct potential from battery 43 and potentiometer 44 upon output terminal 50 which, in general, is greater than the magnitude of the constant voltage $K_3$ appearing at terminal 42 and corresponding to the third term of the voltage equation. That is, in general, this direct voltage over-corrects the output voltage so that an additional positive direct voltage is required at terminal 42 to cancel this over correction and produce a condition where the constant term $K_3$ is exactly cancelled out. This additional voltage is supplied from battery 43 by a variable resistance 52 and a lead 53 which provides an adjustable positive direct voltage at output terminal 42 corresponding to voltage source 32, illustrated in Figure 1. The difference between the positive voltage thus produced and the positive direct voltage impressed upon terminal 50 by its connection to the junction between the resistances 48, 49 exactly cancels out the constant term $K_3$.

With the cancellation of the constant term and the linear term in the manner just described, it will be evident that the final voltage appearing between output terminals 42, 50 is proportional to the instantaneous value of the square of the alternating signal input voltage. Thus, we have provided a simple, rugged circuit for producing an output which is the square or any other desired power function of the instantaneous value of an input voltage which utilizes a minimum of standard circuit components and does not require the use of vacuum tubes with their attendant problems, such as drift, or dependence upon varying power line voltages.

While the invention has been described in connection with present, preferred embodiments thereof, it is to be understood that this description is illustrative only and is not intended to limit the invention, the scope of which is defined by the appended claims.

We claim:

1. In a circuit for producing an output which is a power function of an alternating signal input, in combination, a non-linear resistance having a characteristic such that current passing therethrough is a power function of the applied voltage, so that a portion of the characteristic is substantially coincident with a portion of a curve representing a selected power function, said curve being shifted laterally with respect to the coordinate origin, means for supplying an alternating input signal voltage to said resistance, means for supplying a direct voltage bias to said resistance of such magnitude that the sum of the direct and alternating voltages lies at all times within said portion of the characteristic, whereby the resulting current through said resistance is a power function of said input voltage and the distance of lateral shifting of said curve with respect to the coordinate origin, said function, upon expansion, containing a term of the selected power of said function, and other terms representing lower powers, means for producing an output voltage representative of the variation in current through said resistance, and means for supplying bias voltages to said output voltage for cancelling out from said output voltage the voltages representative of said terms of lower powers than the desired term.

2. In a circuit for producing an output which is the square of an alternating signal input, in combination, a non-linear resistance having a characteristic such that current passing therethrough is a parabolic function of the applied voltage over a portion of said characteristic, such parabolic portion forming a part of a parabola shifted laterally with respect to the coordinate origin, means for supplying an alternating input signal voltage to said resistance, means for supplying a direct voltage bias to said resistance of such magnitude that the sum of the direct and alternating voltages lies at all times within said parabolic portion of the characteristic, means for producing an output voltage representative of the variation in current passing through said resistance, said output voltage being a function of the square of the input voltage and the distance of lateral shifting of said curve with respect to the coordinate origin, said function including a squared term, a linear term, and a constant term, and means for supplying first and second bias voltages to said output voltage for cancelling out the voltages representative of said linear term and said constant term.

3. A circuit in accordance with claim 2 in which said output voltage is produced, at least in part, across a fixed resistance connected in series with said non-linear resistance and having an ohmic value many times less than that of said non-linear resistance.

4. In a circuit for producing an output which is the square of an alternating signal input, in combination, a non-linear resistance, a portion of the voltage-current characteristic of said resistance being of parabolic form, means for feeding an alternating signal voltage to said resistance, means for supplying a first direct voltage bias to said resistance so as to cause operation thereof at said parabolic portion of its characteristic, means for producing an output voltage representative of the current flowing through said non-linear resistance, said output voltage varying in accordance with the square of the input voltage, a constant times the input voltage, and a constant, means for feeding a second direct voltage so as to oppose said output voltage and eliminate said constant, a multiplying circuit, and means for supplying said alternating signal voltage to said multiplying circuit, the output of said multiplying circuit being connected in voltage opposition to said output voltage so as to eliminate the voltage variation in accordance with a constant times the signal input.

5. In a circuit for producing an output which is the square of an alternating signal input, in combination, a non-linear resistance, the voltage-current characteristic of said resistance having a parabolic portion coincident with a parabolic curve laterally shifted with respect to the origin of coordinates, means for supplying an alternating signal input to said resistance, means for supplying a first direct voltage bias to said resistance of such magnitude as to cause operation thereof within the parabolic portion of its characteristic, whereby the current variation in said resistance varies in accordance with a function, the expansion of which includes a term equal to a constant times the square of the input voltage, a second constant times the input voltage, and a third constant, means including a resistor connected in series with said non-linear resistance for producing an output voltage representative of such current variation, means for supplying a second direct voltage proportional to said third constant to act in opposition to said output voltage, and a multiplying circuit for supplying a voltage proportional to said second constant times said input voltage to act in opposition to said output voltage.

6. In a circuit for producing an output which is the square of an alternating signal input, in combination, a unit including a non-linear resistance, the voltage-current characteristic of said resistance having a parabolic portion, and a fixed resistor connected in series with and having a substantially lower ohmic value than said resistance, a second unit including a pair of series connected resistances, at least one of which is a variable resistance, means for supplying an alternating signal voltage and a variable direct current bias voltage to both units, a first output terminal connected to the junction between said non-linear resistance and said fixed resistor, a second output terminal connected to the junction between said series-connected resistances, and means for supplying a variable direct voltage to said first output terminal.

7. In a circuit for producing an output which is the square of an alternating signal input, in combination, a unit including a non-linear resistance, the voltage-current characteristic of said resistance having a parabolic portion, and a fixed resistor connected in series therewith of substantially lower ohmic value than said resistance, a second unit including a pair of series-connected resistances, at least one of which is a variable resistance, an input terminal connected to one end of each unit, a condenser having one terminal thereof connected to a second input terminal and its other terminal connected to the other ends of said units, a first output terminal connected to the junction between said non-linear resistance and said fixed resistor, a second output terminal connected to the junction between the resistances of said second unit, a battery, a potentiometer connected in shunt therewith, a lead connecting one terminal of said battery to said one end of each unit, a variable resistance connecting the other terminal of said battery to said first output terminal, and a fixed resistance connecting the contactor of said potentiometer to said other end of said units.

8. In a circuit for providing an output which is the square of an alternating signal input, in combination, a unit including a non-linear resistance, the voltage-current characteristic of said resistance having a parabolic portion, and a first resistor connected in series with said non-linear resistance, a second unit including a pair of series connected resistors, means for supplying an alternating signal voltage and a variable direct current bias voltage to both of said units, a first output terminal connected to the junction beween said non-linear resistance and said first resistor, a second output terminal connected between said series-connected resistors, and means for supplying a variable direct voltage to said first output terminal.

DESLONDE R. de BOISBLANC.
ROSS S. MARSDEN, Jr.

References Cited in the file of this patent
UNITED STATES PATENTS

| Number | Name | Date |
|---|---|---|
| 2,418,516 | Lidow | Apr. 8, 1947 |